US008885708B2

(12) United States Patent
Hayden et al.

(10) Patent No.: US 8,885,708 B2
(45) Date of Patent: Nov. 11, 2014

(54) REUSABLE AND EXTENSIBLE FRAMEWORK FOR MULTIMEDIA APPLICATION DEVELOPMENT

(75) Inventors: John R. Hayden, Ringwood, NJ (US); Robert D. Kirnum, Woodcliff, NJ (US); Joseph A. Fisher, Lake Hopatcong, NJ (US); Brian M. Nixon, Oxford, NJ (US); Arun V. Eledath, Ledgewood, NJ (US); Ranjan Singh, Morristown, NJ (US)

(73) Assignee: Dialogic Corporation, Montreal (CA)

( * ) Notice: Subject to any disclaimer, the term of this patent is extended or adjusted under 35 U.S.C. 154(b) by 585 days.

(21) Appl. No.: 12/635,928

(22) Filed: Dec. 11, 2009

(65) Prior Publication Data

US 2011/0142032 A1 Jun. 16, 2011

(51) Int. Cl.
*H04L 12/66* (2006.01)
*H04N 19/40* (2014.01)
*G06F 13/00* (2006.01)

(52) U.S. Cl.
CPC .......... *H04L 12/66* (2013.01); *H04N 19/00472* (2013.01)
USPC ..................................... 375/240.12; 719/328

(58) Field of Classification Search
None
See application file for complete search history.

(56) References Cited

U.S. PATENT DOCUMENTS

| 6,405,363 B1* | 6/2002 | Carlson et al. ................. 717/100 |
| 2002/0012329 A1* | 1/2002 | Atkinson et al. .............. 370/330 |
| 2003/0056029 A1* | 3/2003 | Huang et al. .................. 709/328 |
| 2005/0091672 A1* | 4/2005 | Debique et al. ............... 719/328 |
| 2007/0006068 A1* | 1/2007 | Kren ............................. 715/513 |
| 2009/0164655 A1* | 6/2009 | Pettersson et al. ............ 709/231 |

OTHER PUBLICATIONS

Pages 1-7, FFMPEG, http://ffmpeg.org.
Pages 1-2, Welcome to ViTooki—The Video Toolkit, VITOOKI, http://vitooki.sourceforge.net/.
Pages 1-2, Adobe Open Source, ©2008 Adobe Systems Incorporated, http://opensource.adobe.com.

* cited by examiner

*Primary Examiner* — Behrooz Senfi
*Assistant Examiner* — Mohammed Jebari
(74) *Attorney, Agent, or Firm* — Chapin IP Law, LLC

(57) ABSTRACT

Systems and methods of developing and/or implementing multimedia applications. The system provides an extensible framework including an application layer, a framework utility layer, and a core engine layer. The framework utility layer includes an application programming interface, a video codec sub-framework (XCF), a video packetization sub-framework (XPF), and a video/text overlay sub-framework (XOF). The core engine layer includes one or more core codec engines and one or more core rendering engines. The XCF, XPF, and XOF sub-frameworks are effectively decoupled from the multimedia applications executing on the application layer, and the core codec and rendering engines of the core engine layer, allowing the XCF, XPF, and XOF sub-frameworks and core codec/rendering engines to be independently extensible. The system also fosters enhanced reuse of existing multimedia applications across a plurality of multimedia systems.

15 Claims, 9 Drawing Sheets

```
EncoderCreate(...)
EncoderDestroy(...)
EncoderSetDebug(...)
EncoderTrace(...)
EncoderGetPStreamCoderType(...)
EncoderSetDci(...)
EncoderGetDci(...)
EncoderStart(...)
EncoderStop(...)
EncoderProcessData(...)
Encoder_GenIFrame(...)
```

```
DecoderCreate(...)
DecoderDestroy(...)
DecoderSetDebug(...)
DecoderTrace(...)
DecoderGetPStreamCoderType(...)
DecoderSetDci(...)
DecoderGetDci(...)
DecoderStart(...)
DecoderStop(...)
DecoderProcessData(...)
```

```
OvlMixerCreate(...)
OvlMixerDestroy(...)
OvlMixerStartAll(...)
OvlMixerStopAll(...)
OvlWindowCreate(...)
OvlWindowSubmitContent(...)
OvlWindowClearContent(...)
OvlWindowStart(...)
OvlWindowStop(...)
```

| Pstream module 410 | API module 402 |||
|---|---|---|---|
| | Encoder interface module 404 | Decoder interface module 406 | Overlay interface module 408 |

| Platform abstraction sub-layer 508 | Debug object 506 | Encoder object 502 | Decoder object 504 |
|---|---|---|---|

| Packetizer object 602 | Depacketizer object 604 | Bitstream parser object 606 |
|---|---|---|

| Video/text overlay object 702 |
|---|

*Fig. 7*

REUSABLE AND EXTENSIBLE FRAMEWORK FOR MULTIMEDIA APPLICATION DEVELOPMENT

CROSS REFERENCE TO RELATED APPLICATIONS

—Not applicable—

STATEMENT REGARDING FEDERALLY SPONSORED RESEARCH OR DEVELOPMENT

—Not applicable—

FIELD OF THE INVENTION

The present application relates generally to multimedia frameworks, and more specifically to systems and methods that employ extensible frameworks for the development and/or implementation of multimedia applications across a plurality of multimedia systems.

BACKGROUND OF THE INVENTION

Recent years have seen a significant increase in demand for multimedia applications. For example, increasing demand has been seen for multimedia applications used in conjunction with user access devices such as cell phones and mobile personal computers (PCs). Such multimedia applications include "real-time" video applications such as video conferencing, "streaming" video applications for downloading video clips over a network, and "off-line" transcoding applications.

Because user access devices such as cell phones and mobile PCs generally provide relatively low upload and download bandwidths, such devices typically employ video coding/compression formats such as MPEG-2, MPEG-4, H.263, or H.264 to reduce the transport time and storage requirements of video content accessed over the network. Some user access devices may also rely on media gateways in the network to run transcoding and transrating applications needed to perform video coding/compression. As employed herein, the term "media gateway" refers to a translation system, device, or service for converting digital media streams from one computer or communications network to another. Transcoding applications typically implement video processing operations to depacketize the data of video content accessed over the network, to decompress the video data from one coding/compression format (e.g., H.263) to a raw data stream, to re-compress the raw data stream to another coding/compression format (e.g., MPEG-4), and to re-packetize the video data for subsequent forwarding over the network, which can include broadband and mobile networks. Transrating applications may be employed to transform the bit rate of the video data to assure connectivity between the broadband and mobile networks. Media gateways can also be configured to run content adaptor applications for adapting the video content to the display capabilities of specific user access devices.

Stream-combination or stream-mixing applications and video/text overlay applications may also be employed to combine video streams and/or text while the video data is in its decompressed form. For example, media servers such as video conferencing servers may be configured to run stream-combination applications for receiving video content from multiple sources over the network, depacketizing the data of the video content, decompressing the video data to raw data streams, combining the raw data streams, and re-compressing and re-packetizing the video data for subsequent forwarding over the network to target conference devices, which may include one or more mobile devices. Further, media gateways and/or media servers may be configured to run video/text overlay applications for receiving video content over the network, depacketizing the data of the video content, decompressing the video data to a raw data stream, combining the raw data stream with data from additional content, such as content corresponding to a "text crawl" at the bottom of a display screen, and re-compressing and re-packetizing the video data for subsequent forwarding over the network to one or more user access devices.

Traditionally, providers of multimedia systems such as media servers, media gateways, video transcoders, content adaptation platforms, etc., have incorporated multimedia applications such as those described above separately into each system, with minimal reuse of the applications between the respective systems. Such multimedia applications can become tightly coupled with the multimedia systems configured to run them, making it difficult to replace one multimedia application with another, or to upgrade multimedia applications from one release to the next. Such multimedia applications may also be implemented in various multimedia systems in different ways. For example, providers of multimedia systems may employ different implementations of multimedia applications in their products based on the operating system that the multimedia system is running, making it difficult to reuse multimedia application code from one multimedia system in other multimedia systems. Such difficulties in reusing, replacing, and/or upgrading multimedia applications in multimedia systems can translate into higher production costs, increased development time, and slower time to market.

It would therefore be desirable to have systems and methods of developing and/or implementing multimedia applications in multimedia systems that avoid at least some of the drawbacks of the traditional approaches described above.

BRIEF SUMMARY OF THE INVENTION

In accordance with the present application, systems and methods of developing and/or implementing multimedia applications are disclosed that foster the reuse of the multimedia applications across a plurality of multimedia systems. The presently disclosed systems and methods employ an extensible framework that is effectively decoupled from the multimedia applications and core codec/rendering engines, allowing the multimedia applications, the framework utilities, the core codec (encoder/decoder) engines, and the core rendering engines to be independently modified, replaced, and/or upgraded. Moreover, the extensible framework provides easy-to-use, flexible, operating system (OS) independent interfaces that multimedia application developers can use to create a range of multimedia applications.

In accordance with one aspect, a system for developing and/or implementing multimedia application programs (referred to herein as the "multimedia applications") provides an extensible framework that includes an application layer component (referred to herein as the "application layer"), a framework utility layer component (referred to herein as the "framework utility layer"), and a core engine layer component (referred to herein as the "core engine layer"). One or more multimedia applications, such as transcoding applications, transrating applications, content adaptor applications, stream-combination applications, video/text overlay applications, etc., can execute on the application layer. The framework utility layer includes an application programming interface (API), an extensible video codec sub-framework (XCF), an extensible video packetization sub-framework (XPF), an extensible video/text overlay sub-framework (XOF), and a built-in debug support utility that can be used across the respective sub-frameworks. The API provides functional interfaces for the multimedia applications executing on the application layer. The XCF sub-framework provides transcoding and transrating functionalities, and supports multiple coding/compression formats such as MPEG-2, MPEG-4, H.263, H.264, or any other suitable coding/compression format. The XPF sub-framework supports multiple packetization/depacketization schemes based on the real-time transport protocol (RTP) or any other suitable protocol. The XOF sub-framework provides video/text overlay functionalities. The core engine layer includes one or more core codec engines and one or more core rendering engines. Each core codec engine is operative to transform encoded and/or compressed multimedia data into a raw (i.e., unencoded and/or decompressed) data stream for subsequent use by the core rendering engines. Each core rendering engine is operative to process one or more raw data streams into a multimedia output for display or presentation on a video display monitor, an audio speaker, or any other suitable display or presentation device.

In accordance with one exemplary aspect, the extensible framework is implemented at least in part using the C++ programming language, the Java programming language, or any other suitable object-oriented programming (OOP) language. The building blocks of such an OOP system are called "objects", which are programming units that group together data structures (the "data") and the operations or procedures (the "methods") that use or affect that data. Each object therefore includes data and one or more methods that can be performed on that data. Each object also has associated interfaces consisting of public methods and instantiated data. In accordance with this exemplary aspect, each of the XCF, XPF, and XOF sub-frameworks within the framework utility layer is implemented as an object having associated data, methods, and interfaces. The XCF, XPF, and/or XOF sub-frameworks are configured to publish or "export" their interfaces to the API, which, in turn, provides its functional interfaces for the multimedia applications executing on the application layer. The XCF, XPF, and XOF sub-frameworks are therefore effectively decoupled from the multimedia applications executing on the application layer. The XCF, XPF, and/or XOF sub-frameworks are also configured to export their interfaces to the core codec engines and core rendering engines, respectively, of the core engine layer. The XCF, XPF, and XOF sub-frameworks are therefore also effectively decoupled from the core codec and rendering engines of the core engine layer.

By effectively decoupling the XCF, XPF, and XOF sub-frameworks from the multimedia applications, the core codec engines, and/or the core rendering engines, independent extensibility of the XCF, XPF, and XOF sub-frameworks, and the core codec and rendering engines, can be achieved. For example, the XCF sub-framework can be independently extended to support additional codec engines, which, in turn, can be upgraded to support new codec engine releases. Further, the XPF sub-framework can be independently extended to support additional packetization/depacketization schemes, and the XOF sub-framework can be independently extended to support additional video/text/image overlay applications. The framework utility layer can also be extended to include additional sub-frameworks, such as a container sub-framework or any other suitable sub-framework. Moreover, the core rendering engines can be independently extended to support the additional video/text/image overlay applications, and can be upgraded to support new rendering engine releases. The effective decoupling of the XCF, XPF, and XOF sub-frameworks from the multimedia applications and the core codec/rendering engines also provides the extensible framework with easy-to-use, flexible, OS-independent interfaces that allow enhanced reuse of existing multimedia applications across a plurality of multimedia systems.

Other features, functions, and aspects of the invention will be evident from the Drawings and/or the Detailed Description of the Invention that follow.

BRIEF DESCRIPTION OF THE SEVERAL VIEWS OF THE DRAWINGS

The invention will be more fully understood with reference to the following Detailed Description of the Invention in conjunction with the drawings of which:

FIGS. 3a-3c are illustrative lists of format definitions for a plurality of exemplary methods that can be accessed by multimedia applications executing on the application layer of FIG. 2, via an application programming interface (API) included in the framework utility layer of FIG. 2;

FIG. 4 is a block diagram of the API included in the framework utility layer of FIG. 2;

FIG. 5 is a block diagram of an extensible video codec sub-framework (XCF) included in the framework utility layer of FIG. 2;

FIG. 6 is a block diagram of an extensible video packetization sub-framework (XPF) included in the framework utility layer of FIG. 2;

FIG. 7 is a block diagram of an extensible video/text overlay sub-framework (XOF) included in the framework utility layer of FIG. 2;

DETAILED DESCRIPTION OF THE INVENTION

Systems and methods of developing and/or implementing multimedia applications are disclosed that foster the reuse of multimedia applications across a plurality of multimedia systems. The presently disclosed systems and methods employ an extensible framework for the development and/or implementation of multimedia applications that is effectively decoupled from the multimedia applications and core codec/rendering engines, allowing the multimedia applications, the framework utilities, the core codec (encoder/decoder) engines, and the core rendering engines to be independently modified, replaced, and/or upgraded. Moreover, the extensible framework provides easy-to-use, flexible, operating system (OS) independent interfaces that multimedia application developers can use to create a range of multimedia applications.

As employed herein, the term "reuse" refers to taking a complete multimedia application as a software component, and incorporating it into a target multimedia system, adding a minimal amount of software, as required and/or as desired, to adapt the multimedia application to the specific needs of the target system. Further, as employed herein, the term "extensible" refers to a manner of software design that takes into account possible future advances and seeks to accommodate them by adding new functionality or modifying existing functionality, while at the same time minimizing any impact to existing system functions.

Figure 1:
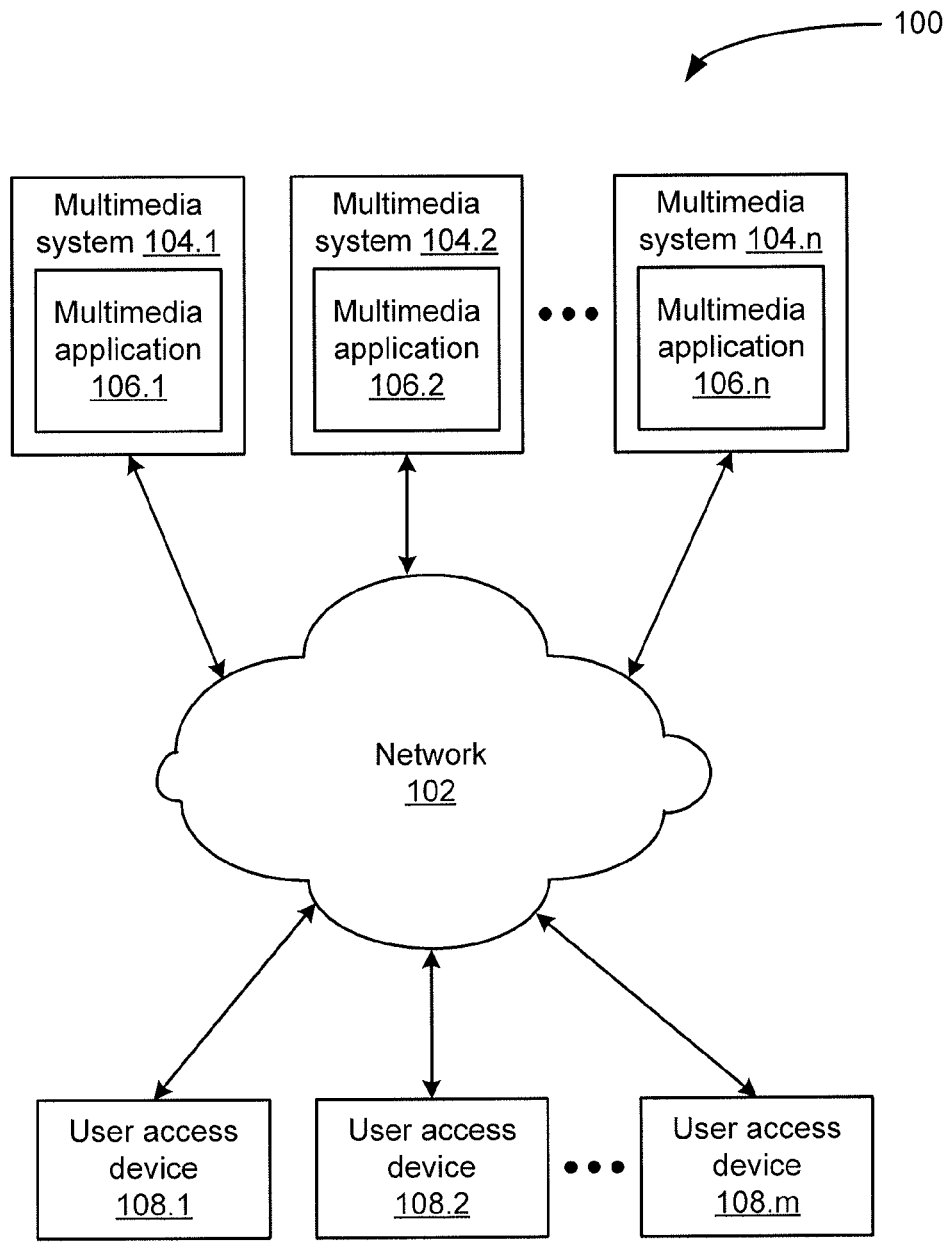
FIG. 1 is a block diagram of an exemplary system for implementing an extensible framework for the development and/or implementation of multimedia applications across a plurality of multimedia systems, according to an exemplary embodiment of the present application.

FIG. 1 depicts an illustrative embodiment of an exemplary system 100 for implementing an extensible framework for the development and/or implementation of multimedia applications across a plurality of multimedia systems, in accordance with the present application. In accordance with the illustrated embodiment, the system 100 includes a plurality of multimedia systems 104.1-104.n and a plurality of user access devices 108.1-108.m communicably coupled to at least one network 102. For example, the plurality of multimedia systems 104.1-104.n may include a media server computer, a media gateway computer, a video transcoding system, a content adaptation platform, or any other suitable type of multimedia system. Moreover, the plurality of user access devices 108.1-108.m may include a user client computer, a personal computer (PC), a mobile PC such as a laptop computer, a personal digital assistant (PDA), a cell phone, or any other suitable type of user access device. The network 102 may include a broadband network such as the Internet, a mobile network, and/or any other suitable type of computer or communications network.

As shown in FIG. 1, the plurality of multimedia systems 104.1-104.n are configured to run a plurality of multimedia applications 106.1-106.n, respectively. For example, the plurality of multimedia applications 106.1-106.n may include a transcoding application, a transrating application, a content adaptor application, a stream-combination application, a video/text overlay application, or any other suitable type of multimedia application. Each of the multimedia systems 104.1-104.n therefore includes at least one processor operative to execute at least one computer program out of at least one memory to implement the processing operations dictated by the respective multimedia application 106.1-106.n. In accordance with the illustrative embodiment of FIG. 1, each of the multimedia applications 106.1-106.n employs an application programming interface (API) of a multimedia framework to communicate with one or more program modules (referred to herein as "sub-frameworks") for performing the processing operations required by the respective multimedia application.

Figure 2:
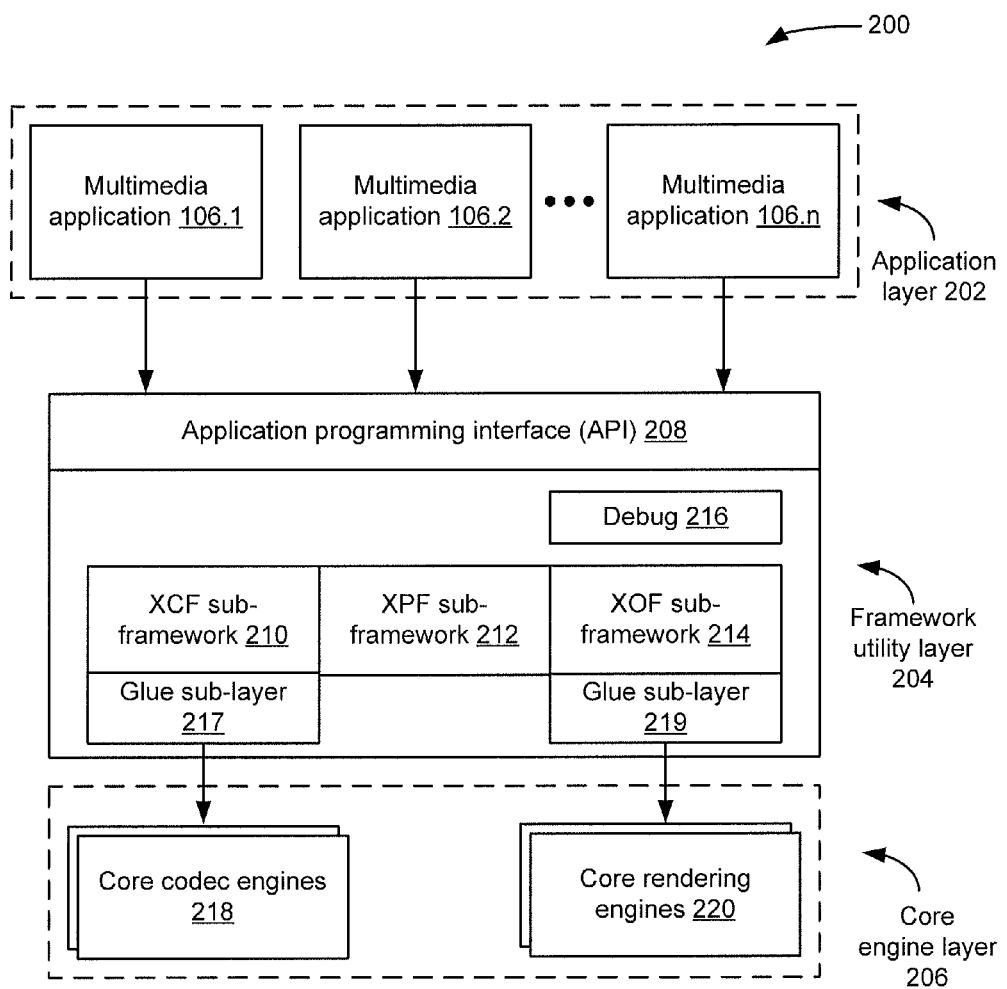
FIG. 2 is a block diagram of the extensible framework implemented in the system of FIG. 1, including an application layer, a framework utility layer, and a core engine layer, according to an exemplary embodiment of the present application.

FIG. 2 depicts an illustrative embodiment of an exemplary extensible framework 200 for use in conjunction with the plurality of multimedia applications 106.1-106.n (see also FIG. 1). As shown in FIG. 2, the extensible framework 200 includes an application layer 202, a framework utility layer 204, and a core engine layer 206. The multimedia applications 106.1-106.n are operative to execute on the application layer 202. In accordance with the illustrative embodiment of FIG. 2, the framework utility layer 204 includes an application programming interface (API) 208, an extensible video codec sub-framework (XCF) 210, an extensible video packetization sub-framework (XPF) 212, an extensible video/text overlay sub-framework (XOF) 214, a built-in debug support utility 216 that can be used across the respective sub-frameworks 210, 212, and 214, and "glue" sub-layers 217 and 219, which are discussed below with reference to FIG. 9. The API 208 provides functional interfaces for the multimedia applications 106.1-106.n executing on the application layer 202. The XCF sub-framework 210 provides transcoding and transrating functionalities, and supports multiple coding/compression formats, such as MPEG-2, MPEG-4, H.263, H.264, or any other suitable coding/compression format. The XPF sub-framework 212 supports multiple packetization/depacketization schemes based on the real-time transport protocol (RTP) or any other suitable protocol. The XOF sub-framework 214 provides video/text overlay functionalities. The core engine layer 206 includes one or more core codec engines 218 and one or more core rendering engines 220. Each of the core codec engines 218 includes one or more video encoders/decoders, such as an MPEG-2 encoder/decoder, an MPEG-4 encoder/decoder, an H.263 encoder/decoder, an H.264 encoder/decoder, or any other suitable type of encoder/decoder, for transforming encoded and/or compressed multimedia data (e.g., video or audio data) into a raw (i.e., unencoded and/or decompressed) data stream, and re-encoding and/or re-compressing the raw data stream after processing. Each of the core rendering engines 220 includes one or more renderers for processing raw data streams into a multimedia output (e.g., a video or audio output) for display or presentation on a video display monitor, an audio speaker, and/or any other suitable display or presentation device.

In accordance with the illustrative embodiment of FIG. 2, the extensible framework 200 may be implemented at least in part using the C++ programming language, the Java programming language, or any other suitable object-oriented programming (OOP) language. The building blocks of such an OOP system are called "objects", which are programming units used to group together data structures (also referred to herein as "data") and the operations or procedures (also referred to herein as "methods") that use or affect that data. Each object therefore includes data and one or more methods that can be performed on that data. The act of grouping data and methods into an object is called "encapsulation". Objects also have associated interfaces consisting of public methods and real instances of the respective data structures. An object can be configured to publish or "export" its interfaces to one or more software applications or engines. For example, an object can receive one or more commands or instructions at its interface from a specified software application, directing that object to perform one of its associated methods. Each command or instruction received at the object interface generally includes an indication of the selected method, such as the "name" of the method, along with a number of arguments appropriate for that method.

In an OOP system, an object type can be defined by an abstraction called a "class", which, in turn, is defined by associated instance variables and methods. Each object within a particular class has separate copies of the instance variables and methods defined for that class. A class can be used to create a particular instance of an object. Further, a hierarchy of classes can be defined such that a particular class has one or more subclasses. Each subclass inherits the class definition (i.e., the instance variables and methods) of its parent class. Each subclass can also add to or modify the behavior specified by the class definition inherited from its parent class.

In accordance with the illustrative embodiment of FIG. 2, each of the XCF, XPF, and XOF sub-frameworks 210, 212, 214 within the framework utility layer 204 is implemented as an object having associated data, methods, and interfaces. Further, each of the XCF, XPF, and XOF sub-frameworks 210, 212, 214 can publish or "export" its interfaces to the API 208, which, in accordance with the illustrated embodiment, provides its functional interfaces for the multimedia applications 106.1-106.n executing on the application layer 202. The XCF, XPF, and XOF sub-frameworks 210, 212, 214 within the framework utility layer 204 are therefore effectively decoupled from the multimedia applications 106.1-106.n executing on the application layer 202. In accordance with the illustrated embodiment, each of the XCF, XPF, and XOF sub-frameworks 210, 212, 214 can also export its interfaces to one or more of the core codec engines 218 and the core rendering engines 220. The XCF, XPF, and XOF sub-frameworks 210, 212, 214 within the framework utility layer 204 are therefore also effectively decoupled from the core codec and rendering engines 218, 220 within the core engine layer 206.

In accordance with the illustrative embodiment of FIG. 2, the XCF and XOF sub-frameworks 210, 214 export their interfaces to the core codec and rendering engines 218, 220, respectively, and to the API 208. FIGS. 3a-3c depict illustrative lists of format definitions implemented within the API 208 for a plurality of methods associated with the XCF and XOF sub-frameworks 210, 214. Such format definitions can be accessed, as required and/or as desired, by the multimedia applications 106.1-106.n executing on the application layer 202 (see FIG. 2). As shown in FIGS. 3a-3c, the API 208 includes encoder-related format definitions 300a (see FIG. 3a), decoder-related format definitions 300b (see FIG. 3b), and overlay-related format definitions 300c (see FIG. 3c). The format definitions 300a, 300b correspond to the methods associated with the XCF sub-framework 210, and the format definitions 300c correspond to the methods associated with the XOF sub-framework 214. Each of the format definitions 300a, 300b, 300c define the format by which the corresponding methods can be invoked by the multimedia applications 106.1-106.n.

In accordance with the illustrative embodiment of FIG. 3a, the encoder-related format definitions 300a include an EncoderCreate( . . . ) definition for creating an encoder, an EncoderDestroy( . . . ) definition for destroying an encoder, an EncoderSetDebug( . . . ) definition for setting the built-in debug support utility 216 (see FIG. 2) for an encoder, an EncoderTrace( . . . ) definition for tracing an encoder video stream, an EncoderGetPStreamCoderType( . . . ) definition for obtaining the PStream (referred to herein as the "Packet Stream") coder type, an EncoderSetDci( . . . ) definition for setting the DCI (Decoder Configuration Information) interface for an encoder, an EncoderGetDci( . . . ) definition for obtaining the DCI interface for an encoder, an Encoder Start( . . . ) definition for starting an encoder, an Encoder Stop( . . . ) definition for stopping an encoder, an EncoderProcessData( . . . ) definition for processing encoder data, and an EncoderGenIFrame( . . . ) definition for generating intra-coded frames.

In accordance with the illustrative embodiment of FIG. 3b, the decoder-related format definitions 300b include a DecoderCreate( . . . ) definition for creating a decoder, a DecoderDestroy( . . . ) definition for destroying a decoder, a DecoderSetDebug( . . . ) definition for setting the built-in debug support utility 216 (see FIG. 2) for a decoder, a DecoderTrace( . . . ) definition for tracing a decoder video stream, a DecoderGetPStreamCoderType( . . . ) definition for obtaining the Packet Stream decoder type, a DecoderSet Dci( . . . ) definition for setting the DCI interface for a decoder, a DecoderGetDci( . . . ) definition for obtaining the DCI interface for a decoder, a DecoderStart( . . . ) definition for starting a decoder, a DecoderStop( . . . ) definition for stopping a decoder, and a DecoderProcessData( . . . ) definition for processing decoder data.

In accordance with the illustrative embodiment of FIG. 3c, the overlay-related format definitions 300c include an OvlMixerCreate( . . . ) definition for creating an overlay/mixer, an OvlMixerDestroy( . . . ) definition for destroying an overlay/mixer, an OvlMixerStartAll( . . . ) definition for starting an overlay/mixer, an OvlMixerStopAll( . . . ) definition for stopping an overlay/mixer, an OvlWindowCreate( . . . ) definition for creating an overlay window, an OvlWindowSubmitContent( . . . ) definition for submitting content to an overlay window, an OvlWindowClearContent( . . . ) definition for clearing the content from an overlay window, an OvlWindowStart( . . . ) definition for starting overlay window operations, and an OvlWindowStop( . . . ) definition for stopping overlay window operations.

FIG. 4 depicts an illustrative embodiment of the API 208 included in the framework utility layer 204 (see FIG. 2). As shown in FIG. 4, the API 208 includes an API module 402, an encoder interface module 404, a decoder interface module 406, and an overlay interface module 408. The API module 402 contains the functional interfaces for the multimedia applications 106.1-106.n executing on the application layer 202. For example, the API module 402 may be implemented using the C programming language or any other suitable programming language. The encoder interface module 404 contains the encoder-related format definitions 300a listed in FIG. 3a, the decoder interface module 406 contains the decoder-related format definitions 300b listed in FIG. 3b, and the overlay interface module 408 contains the overlay-related format definitions 300c listed in FIG. 3c. In accordance with the illustrated embodiment, the API 208 further includes a PStream module 410 for use in transferring data, as required and/or as desired, between multiple applications executing on the application layer 202.

FIG. 5 depicts an illustrative embodiment of the XCF sub-framework 210 included in the framework utility layer 204 (see FIG. 2). As shown in FIG. 5, the XCF framework 210 includes an encoder object 502, a decoder object 504, and a debug object 506. Each of the encoder, decoder, and debug objects 502, 504, 506 has associated data, methods, and interfaces. For example, the encoder object 502 can have associated methods for configuring one or more encoders defined by the core codec engines 218 (see FIG. 2), processing frames, performing frame generation decision functions, performing debug operations, tracing encoder video streams, etc. Further, the decoder object 504 can have associated methods for configuring one or more decoders defined by the core codec engines 218, processing frames, performing frame rate estimation functions, performing debug operations, tracing decoder video streams, etc. Moreover, the debug object 506 can have associated methods for use in conjunction with the XCF sub-framework 210, as defined by the debug support utility 216 (see FIG. 2).

In accordance with the illustrative embodiment of FIG. 5, each of the encoder and decoder objects 502, 504 can export its associated interfaces to the API 208. Each of the encoder and decoder objects 502, 504 can also export a common interface to multiple encoders/decoders (codecs), respectively, defined by the core codec engines 218, allowing the multimedia applications 106.1-106.n executing on the application layer 202 to be agnostic to the codec type and/or manufacturer. For example, the codecs defined by the core codec engines 218 may be Intel IPP-based video codecs or any other suitable codec. As shown in FIG. 5, the encoder, decoder, and debug objects 502, 504, 506 are implemented on a platform abstraction sub-layer 508, which facilitates extensibility with a range of instruction set architectures, processors, operating systems, and/or computing platforms. For example, the platform abstraction sub-layer 508 may be configured to facilitate extensibility with the x86 family of instruction set architectures based on the Intel 8086 processor or any other suitable architecture/processor, the Microsoft Windows operating system or any other suitable operating system, and/or the Linux computing platform or any other suitable computing platform.

FIG. 6 depicts an illustrative embodiment of the XPF sub-framework 212 included in the framework utility layer 204 (see FIG. 2). As shown in FIG. 6, the XPF sub-framework 212 includes a packetizer object 602 and a depacketizer object 604. Each of the packetizer and depacketizer objects 602, 604 has associated data, methods, and interfaces. For example, the packetizer and depacketizer objects 602, 604 may have associated methods for packetizing/depacketizing packets conforming to the RTP protocol or any other suitable protocol. In accordance with the illustrated embodiment, the XPF sub-framework 212 further includes a bitstream parser object 606 for use in conjunction with the decoder object 504 within the XCF sub-framework 210.

FIG. 7 depicts an illustrative embodiment of the XOF sub-framework 214 included in the framework utility layer 204 (see FIG. 2). As shown in FIG. 7, the XOF sub-framework 214 includes a video/text overlay object 702, which has associated data, methods, and interfaces. For example, the video/text overlay object 702 can have associated methods for combining raw data streams with data from additional content, such as content corresponding to a "text crawl" at the bottom of a display screen. In accordance with the illustrated embodiment, the video/text overlay object 702 can export its associated interfaces to the API 208. The video/text overlay object 702 can also export a common interface to one or more renderers defined by the core rendering engines 220. For example, the renderers defined by the core rendering engines 220 may be video renderers that are compatible with Microsoft Windows or any other suitable renderer.

Figure 8:
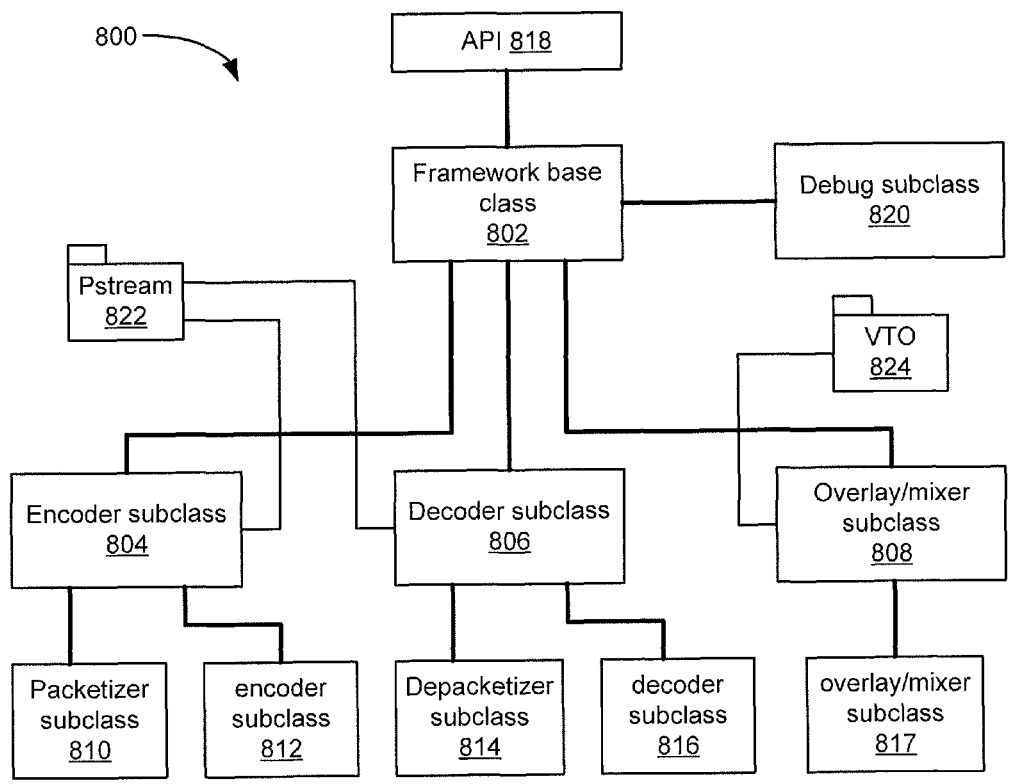
FIG. 8 is a diagram of a hierarchy of classes for the extensible framework of FIG. 2.

FIG. 8 depicts an illustrative class hierarchy 800 for the extensible framework 200 (see FIG. 2). As shown in FIG. 8, the class hierarchy 800 has the fundamental classes for the extensible framework 200, including a framework base class 802, an Encoder subclass 804, a Decoder subclass 806, and an Overlay/mixer subclass 808. The Encoder subclass 804 and the Decoder subclass 806 correspond to the XCF sub-framework 210 (see FIG. 2), and the Overlay/mixer subclass 808 corresponds to the XOF sub-framework 214 (see FIG. 2). The encoder object 502 (see FIG. 5) and the decoder object 504 (see FIG. 5) within the XCF sub-framework 210, and the video/text overlay object 702 (see FIG. 7) within the XOF sub-framework 214, export their interfaces to the API 208 (see FIG. 2), which is depicted via reference numeral 818 in the class hierarchy 800. Each of the Encoder subclass 804 and the Decoder subclass 806 has access to the core functions of the PStream module 410 (see FIG. 4), which is depicted via reference numeral 822 in the class hierarchy 800. The Overlay/mixer subclass 808 has access to the core functions of the video/text overlay object 702, which is depicted via reference numeral 824 in the class hierarchy 800. The class hierarchy 800 further includes a packetizer subclass 810, a lower level encoder subclass 812, a depacketizer subclass 814, a lower level decoder subclass 816, and a lower level overlay/mixer subclass 817. The packetizer subclass 810 and the lower level encoder subclass 812 inherit the class definition of the Encoder subclass 804. The depacketizer subclass 814 and the lower level decoder subclass 816 inherit the class definition of the Decoder subclass 806. The lower level overlay/mixer subclass 817 inherits the class definition of the Overlay/mixer subclass 808. The packetizer subclass 810 and the depacketizer subclass 814 correspond to the XPF sub-framework 212 (see FIG. 2). The class hierarchy 800 also includes a debug subclass 820, which corresponds to the debug support utility 216 (see FIG. 2).

Figure 9:
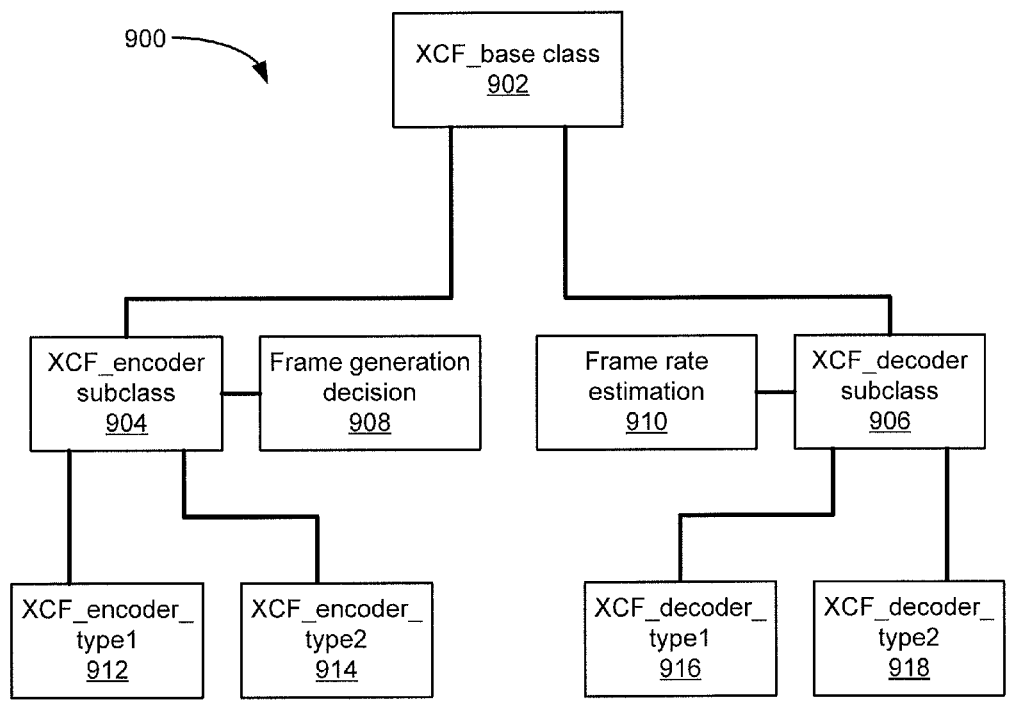
FIG. 9 is a diagram of a hierarchy of classes for the XCF sub-framework of FIG. 5.

FIG. 9 depicts an illustrative class hierarchy 900 for the XCF sub-framework 210 (see FIG. 2). As shown in FIG. 9, the class hierarchy 900 includes an XCF_base class 902, an XCF_encoder subclass 904, and an XCF_decoder subclass 906. The XCF_encoder subclass 904 and the XCF_decoder subclass 906 correspond to the encoder object 502 (see FIG. 5) and the decoder object 504 (see FIG. 5), respectively. In accordance with the illustrated embodiment, the frame generation decision functions of the encoder object 502 are abstracted into a separate class, which is depicted via reference numeral 908 in the class hierarchy 900. The frame rate estimation functions of the decoder object 504 are also abstracted into a separate class, which is depicted via reference numeral 910 in the class hierarchy 900.

In further accordance with the illustrative embodiment of FIG. 9, the encoder object 502 exports its interfaces to the core codec engines 218 (see FIG. 2) via the lower level encoder subclasses 912, 914, which inherit the class definition of the XCF_encoder subclass 904. Similarly, the decoder object 504 exports its interfaces to the core codec engines 218 via the lower level decoder subclasses 916, 918, which inherit the class definition of the XCF_decoder subclass 906. Specifically, the class definition of the subclass 912 specifies the methods that may be invoked to access the core functions of a first predetermined type of encoder (XCF_encoder_type1) included in the core codec engines 218, such as an MPEG-4 encoder or any other suitable type of encoder. Further, the class definition of the subclass 914 specifies the methods that may be invoked to access the core functions of a second predetermined type of encoder (XCF_encoder_type2) included in the core codec engines 218, such as an H.264 encoder or any other suitable type of encoder. Additionally, the class definition of the subclass 916 specifies the methods that may be invoked to access the core functions of a first predetermined type of decoder (XCF_decoder_type1) included in the core codec engines 218, such as an MPEG-4 decoder or any other suitable type of decoder. Further, the class definition of the subclass 918 specifies the methods that may be invoked to access the core functions of a second predetermined type of decoder (XCF_decoder_type2) included in the core codec engines 218, such as an H.264 decoder or any other suitable type of decoder. In effect, the subclasses 912, 914, 916, 918 correspond to the glue sub-layer 217 (see FIG. 2) for interfacing to the various types of codecs (encoders/decoders) included in the core codec engines 218.

Figure 10:
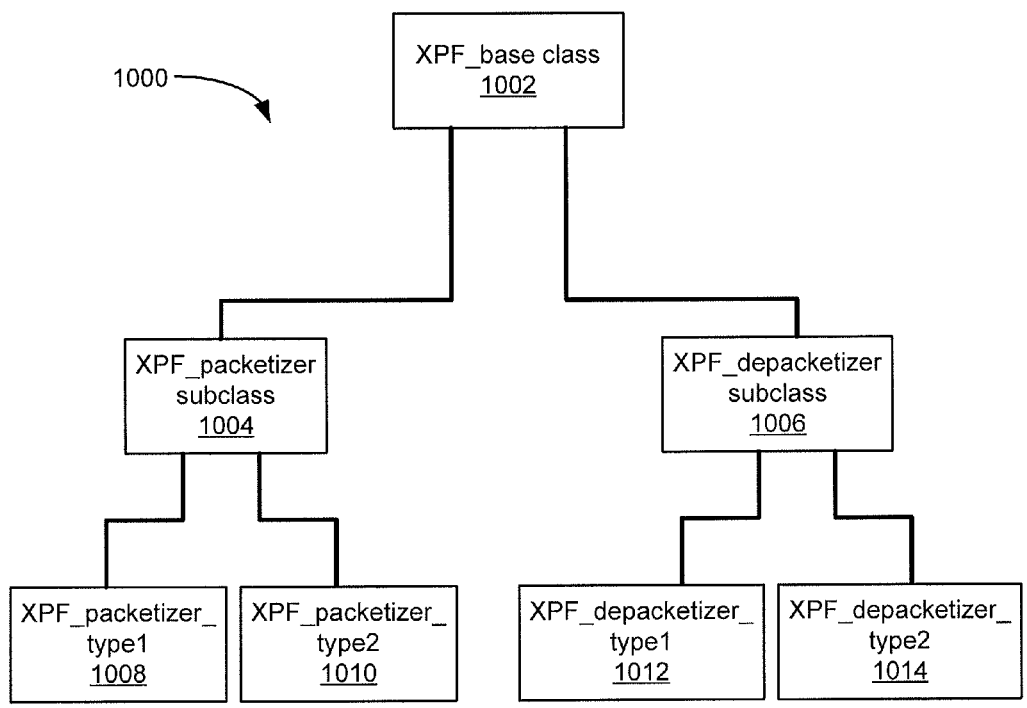
FIG. 10 is a diagram of a hierarchy of classes for the XPF sub-framework of FIG. 6.

FIG. 10 depicts an illustrative class hierarchy 1000 for the XPF sub-framework 212 (see FIG. 2). As shown in FIG. 10, the class hierarchy 1000 includes an XPF_base class 1002, an XPF_packetizer subclass 1004, and an XPF_depacketizer subclass 1006. The XPF_packetizer subclass 1004 and the XPF_depacketizer subclass 1006 correspond to the packetizer object 602 (see FIG. 6) and the depacketizer object 604

(see FIG. 6), respectively. The class hierarchy 1000 further includes one or more subclasses 1008, 1010, which inherit the class definition of the XPF_packetizer subclass 1004, and one or more subclasses 1012, 1014, which inherit the class definition of the XPF_depacketizer subclass 1006. In accordance with the illustrated embodiment, the class definitions of the subclasses 1008, 1010 specify the methods that may be invoked to access the core functions of at least first and second predetermined types of packetizers (XPF_packetizer_type1, XPF_packetizer_type2), such as an MPEG-4 packetizer, an H.264 packetizer, or any other suitable type of packetizer. Further, the class definitions of the subclasses 1012, 1014 specify the methods that may be invoked to access the core functions of at least first and second predetermined types of depacketizers (XPF_depacketizer_type1, XPF_depacketizer_type2), such as an MPEG-4 depacketizer, an H.264 depacketizer, or any other suitable type of depacketizer.

Figure 11:
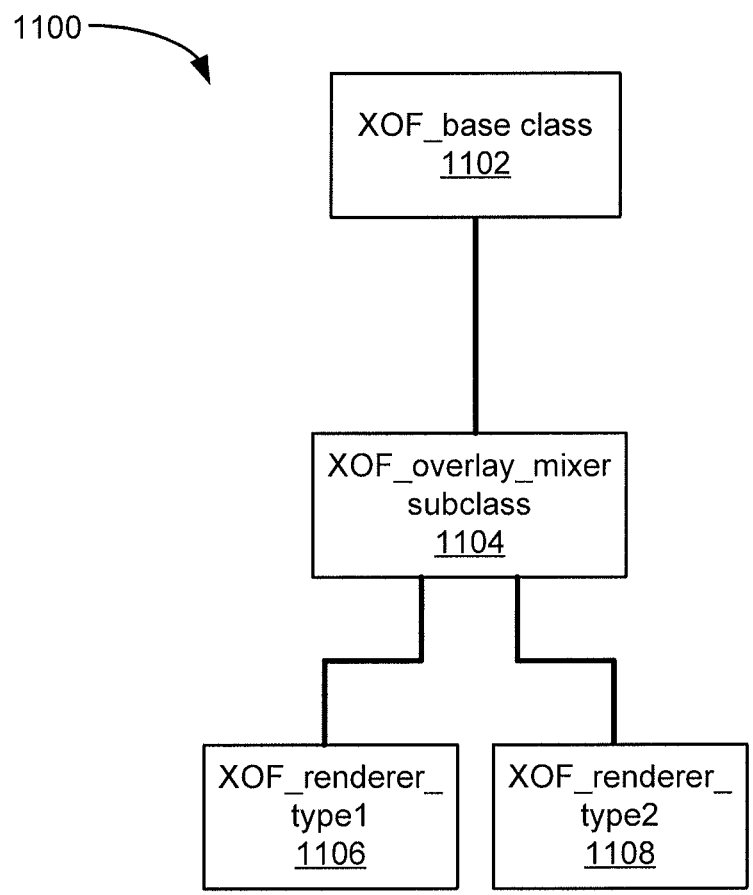
FIG. 11 is a diagram of a hierarchy of classes for the XOF sub-framework of FIG. 7.

FIG. 11 depicts an illustrative class hierarchy 1100 for the XOF sub-framework 212 (see FIG. 2). As shown in FIG. 11, the class hierarchy 1100 includes an XOF base class 1102 and an XOF_overlay_mixer subclass 1104. The XOF_overlay_mixer subclass 1104 corresponds to the video/text overlay object 702 (see FIG. 7). The class hierarchy 1100 further includes the lower level overlay/mixer subclasses 1106, 1108, which inherit the class definition of the XOF_overlay_mixer subclass 1104. In accordance with the illustrative embodiment of FIG. 11, the video/text overlay object 702 (see FIG. 7) exports its interfaces to the core rendering engines 220 (see FIG. 2) via the lower level overlay/mixer subclasses 1106, 1108, which specify the methods that may be invoked to access the core functions of at least first and second predetermined types of renderers (XOF_renderer_type1, XPF_renderer_type2), such as video renderers that are compatible with Microsoft Windows or any other suitable renderers. In effect, the subclasses 1106, 1108 correspond to the glue sublayer 219 (see FIG. 2) for interfacing to the various types of renderers included in the core rendering engines 220.

Figure 12:
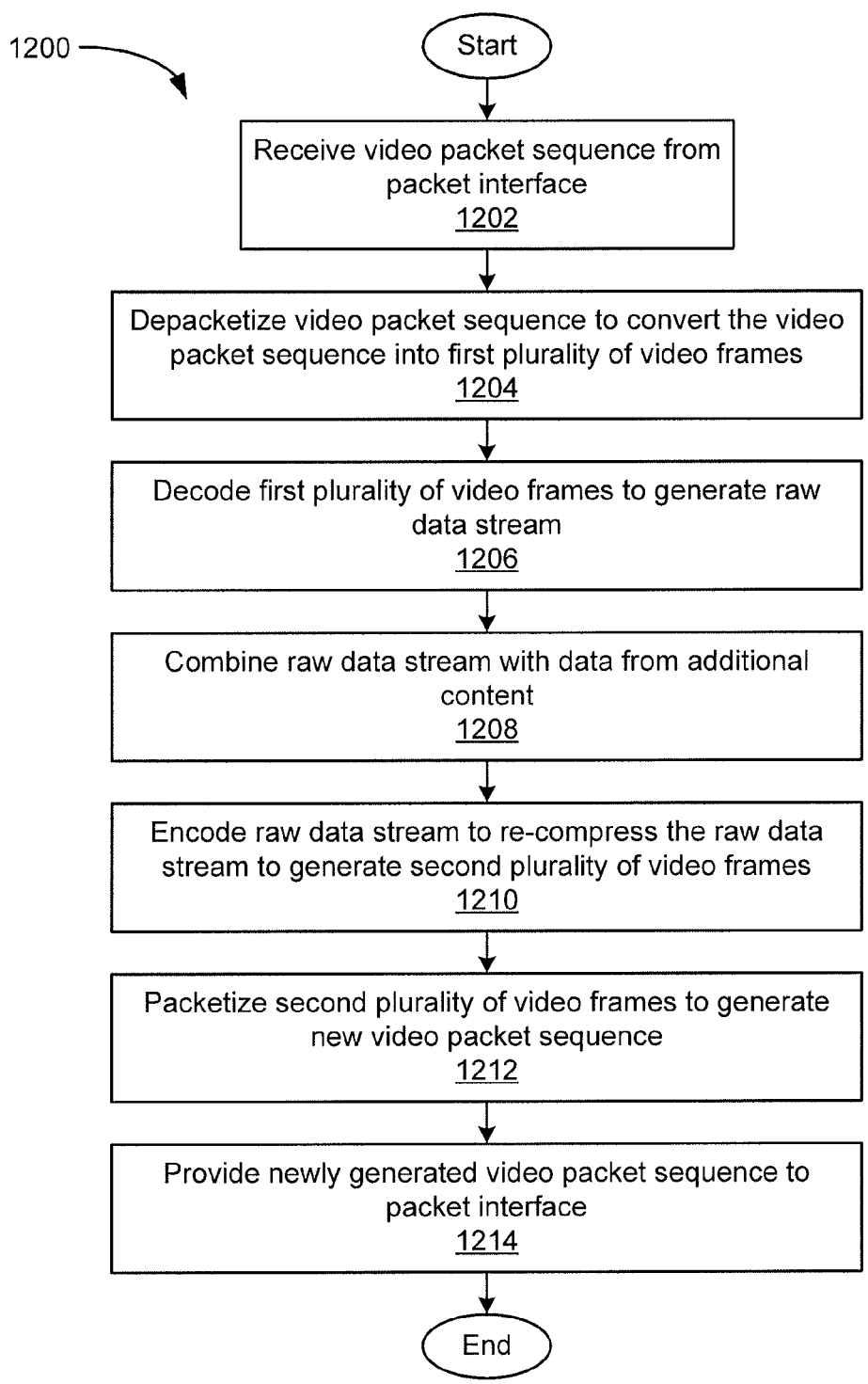
FIG. 12 is a flow diagram illustrating an exemplary method of implementing a multimedia application in a multimedia system using the XCF, XPF, and XOF sub-frameworks of FIGS. 5, 6, and 7, respectively, according to an exemplary embodiment of the present application.

An illustrative method 1200 of developing and/or implementing a multimedia application within a multimedia system is described below with reference to FIGS. 2 and 12. In accordance with the illustrative method of FIG. 12, the extensible framework 200 (see FIG. 2) is employed to develop and/or implement a transcoding application for incorporation into a video transcoding system. It should be appreciated, however, that the extensible framework 200 may be employed to develop and/or implement any other suitable type of multimedia application for incorporation into any other suitable type of multimedia system. It is also noted that the transcoding application is configured for execution on the application layer 202 (see FIG. 2) of the extensible framework 200, invoking the methods associated with the XCF, XPF, and/or XOF sub-frameworks 210, 212, 214 (see FIG. 2), as required and/or as desired, via the interfaces and/or format definitions of the API 208 (see FIG. 2).

As depicted in step 1202 (see FIG. 12), the transcoding application receives a video packet sequence, such as an RTP video packet sequence, from a packet interface of the video transcoding system. As depicted in step 1204, the transcoding application invokes one or more suitable methods of the XPF sub-framework 212 to depacketize the video packet sequence, converting the video packet sequence into a first plurality of video frames compressed according to a specified coding/compression format. As depicted in step 1206, the transcoding application invokes one or more suitable methods of the XCF sub-framework 210 to decode the first plurality of video frames, generating a raw data stream, such as a YUV data stream, from the decoded video frames. As depicted in step 1208, the transcoding application invokes one or more suitable methods of the XOF sub-framework 214 to combine the raw data stream with data from additional content, such as video, text, and/or image content. As depicted in step 1210, the transcoding application invokes one or more suitable methods of the XCF sub-framework 210 to encode the raw data stream, re-compressing the raw data stream to generate a second plurality of video frames compressed according to the same specified coding/compression format or a different coding/compression format. As depicted in step 1212, the transcoding application invokes one or more suitable methods of the XPF sub-framework 212 to packetize the second plurality of video frames, generating a new video packet sequence, such as a new RTP video packet sequence. As depicted in step 1214, the transcoding application provides the newly generated video packet sequence to the packet interface of the video transcoding system for subsequent transmission.

Having described the above illustrative embodiments, other alternative embodiments are possible and/or variations to these illustrative embodiments may be made. For example, it was described that the extensible framework 200 (see FIG. 2) may be implemented at least in part using any suitable object-oriented programming (OOP) language. It was also described that the API module 402 (see FIG. 4) may be implemented using any suitable programming language. In accordance with one or more alternative embodiments, each of the extensible framework 200 and the API module 402 may be implemented using any suitable object-oriented or non-object-oriented programming language.

It is noted that the operations performed by the illustrative embodiments described above are purely exemplary and imply no particular order. Further, these operations can be used in any sequence when appropriate and/or can be partially used. With these illustrative embodiments in mind, it should be understood that such operations can correspond to computer-implemented operations involving data stored on computer systems. Such computer-implemented operations require manipulation of physical quantities, which can take the form of electrical, magnetic, or optical signals capable of being stored, transferred, combined, compared, or otherwise manipulated. It should further be understood that the presently disclosed system can correspond to a device or apparatus for performing such computer-implemented operations. The device or apparatus can be specially constructed for the required purpose, or can be a general-purpose computer including one or more processors operative to execute at least one computer program out of at least one memory for performing the required operations.

It is also noted that one or more of the functions necessary to implement the above-described systems and methods can be embodied—in whole or in part—in hardware, software, or some suitable combination of hardware and software, using programmable micro-controllers, microprocessors, digital signal processors, and/or logic arrays, read-only memory (ROM), random access memory (RAM), CD-ROM, personal computers and computer displays, wire-based, optical fiber-based, or wireless communications media or devices, and/or any other suitable hardware and/or software components and/or devices.

It will be appreciated by those skilled in the art that modifications to and variations of the above-described systems and methods may be made without departing from the inventive concepts disclosed herein. Accordingly, the invention should not be viewed as limited except as by the scope and spirit of the appended claims.

What is claimed is:

1. A multimedia system, comprising:
a multimedia framework; and
at least one processor operative to execute the multimedia framework and at least one multimedia application out of at least one memory,
wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass,
wherein the framework utility layer includes an application programming interface and at least one extensible sub-framework, the extensible sub-framework including one or more first objects, the first subclass corresponding to the one or more first objects,
wherein each of at least some of the one or more first objects is configured to export a first object interface to the application programming interface, such that the extensible sub-framework is decoupled from the multimedia application executing on the application layer via the first object interface,
wherein each of at least some of the one or more first objects is further configured to export a second object interface to the core engine via the lower level subclass, such that the extensible sub-framework is decoupled from the core engine via the second object interface, the class definition of the lower level subclass specifying one or more methods invokable by the multimedia application for accessing one or more functions of the core engine,
wherein the at least one extensible sub-framework includes an extensible codec sub-framework, wherein the at least one core engine includes at least one core codec engine, and wherein the extensible codec sub-framework is operative to utilize the at least one core codec engine while performing operations dictated by the respective multimedia application,
wherein the at least one core codec engine defines one or more encoders,
wherein a first one of the one or more first objects is an encoder object, and
wherein at least a first one of the one or more methods specified by the class definition of the lower level subclass is invokable by the multimedia application for configuring one or more of the encoders defined by the at least one core codec engine.

2. The multimedia system of claim 1 wherein the at least one core codec engine further defines one or more decoders,
wherein a second one of the one or more first objects is a decoder object, and
wherein at least a second one of the one or more methods specified by the class definition of the lower level subclass is invokable by the multimedia application for configuring one or more of the decoders defined by the at least one core codec engine.

3. A multimedia system, comprising:
a multimedia framework; and
at least one processor operative to execute the multimedia framework and at least one multimedia application out of at least one memory,
wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass,
wherein the framework utility layer includes an application programming interface and at least one extensible sub-framework, the extensible sub-framework including at least one first object, the first subclass corresponding to the first object,
wherein the first object is configured to export a first object interface to the application programming interface, such that the extensible sub-framework is decoupled from the multimedia application executing on the application layer via the first object interface,
wherein the first object is further configured to export a second object interface to the core engine via the lower level subclass, such that the extensible sub-framework is decoupled from the core engine via the second object interface, the class definition of the lower level subclass specifying one or more methods invokable by the multimedia application for accessing one or more functions of the core engine,
wherein the at least one extensible sub-framework includes an extensible codec sub-framework, wherein the at least one core engine includes at least one core codec engine, and wherein the extensible codec sub-framework is operative to utilize the at least one core codec engine while performing operations dictated by the respective multimedia application,
wherein the at least one core codec engine defines at least one specified encoder, and
wherein at least a first one of the one or more methods specified by the class definition of the lower level subclass is invokable by the multimedia application for accessing at least one function of the specified encoder defined by the at least one core codec engine.

4. The multimedia system of claim 3 wherein the at least one core codec engine further defines at least one specified decoder, and
wherein at least a second one of the one or more methods specified by the class definition of the lower level subclass is invokable by the multimedia application for accessing at least one function of the specified decoder defined by the at least one core codec engine.

5. A multimedia system, comprising:
a multimedia framework; and
at least one processor operative to execute the multimedia framework and at least one multimedia application out of at least one memory,
wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass,
wherein the framework utility layer includes an application programming interface and at least one extensible sub-framework, the extensible sub-framework including at least one first object, the first subclass corresponding to the first object, wherein the first object is configured to export a first object interface to the application programming interface, such that the extensible sub-framework is decoupled from the multimedia application executing on the application layer via the first object interface, wherein the first object is further configured to export a second object interface to the core engine via the lower level subclass, such that the extensible sub-framework is decoupled from the core engine via the second object interface, the class definition of the lower level subclass specifying one or more methods invokable by the multimedia application for accessing one or more functions of the core engine, wherein the at least one extensible sub-framework includes an extensible codec sub-framework, wherein the at least one core engine includes at least one core code engine, and wherein the extensible codec sub-framework is operative to utilize the at least one core codec engine while performing operations dictated by the respective multimedia application, and wherein the application programming interface includes an encoder module containing at least one first format definition corresponding to at least a first one of the one or more methods specified by the class definition of the lower level subclass.

6. The multimedia system of claim 5 wherein the application programming interface further includes a decoder module containing at least one second format definition corresponding to at least a second one of the one or more methods specified by the class definition of the lower level subclass.

7. A multimedia system comprising:
a multimedia framework; and
at least one processor operative to execute the multimedia framework and at least one multimedia application out of at least one memory,
wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass,
wherein the framework utility layer includes an application programming interface and at least one extensible sub-framework, the extensible sub-framework including one or more first objects, the first subclass corresponding to the one or more first objects,
wherein each of at least some of the one or more first objects is configured to export a first object interface to the application programming interface, such that the extensible sub-framework is decoupled from the multimedia application executing on the application layer via the first object interface,
wherein each of at least some of the one or more first objects is further configured to export a second object interface to the core engine via the lower lever subclass, such that the extensible sub-framework is decoupled from the core engine via the second object interface, the class definition of the lower level subclass specifying one or more methods invokable by the multimedia application for accessing one or more functions of the core engine,
wherein the at least one extensible sub-framework includes an extensible codec sub-framework, wherein the at least one core engine includes at least one core codec engine, and wherein the extensible codec sub-framework is operative to utilize the at least one core codec engine while performing operations dictated by the respective multimedia application, wherein the at least one extensible sub-framework includes an extensible packetization sub-framework in communication with the extensible codec sub-framework, wherein at least a first one of the one or more first objects is a packetizer object, and wherein at least a first one of the one or more methods specified by the class definition of the lower level subclass is invokable by the multimedia application for packetizing multimedia data.

8. The multimedia system of claim 7 wherein at least a second one of the one or more first objects is a depacketizer object, and
wherein at least a second one of the one or more methods specified by the class definition of the lower level subclass is invokable by the multimedia application for depacketizing at least one packet containing multimedia data.

9. A multimedia system, comprising:
a multimedia framework; and
at least one processor operative to execute the multimedia framework and at least one multimedia application out of at least one memory,
wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass,
wherein the framework utility layer includes an application programming interface and at least one extension sub-framework, the extensible sub-framework including at least one first object, the first subclass corresponding to the first object,
wherein the first object is configured to export a first object interface to the application programming interface, such that the extensible sub-framework is decoupled from the multimedia application executing on the application layer via the first object interface,
wherein the first object is further configured to export a second object interface to the core engine via the lower level subclass, such that the extensible sub-framework is decoupled from the core engine via the second object interface, the class definition of the lower level subclass specifying one or more methods invokable by the multimedia application for accessing one or more functions of the core engine,
wherein the at least one extensible sub-framework includes an extensible codec sub-framework, wherein the at least one core engine includes at least one core codec engine, and wherein the extensible codec sub-framework is operative to utilize the at least one core codec engine while performing operations dictated by the respective multimedia application,
wherein the at least one extensible sub-framework includes an extensible packetization sub-framework in communication with the extensible codec sub-framework,
wherein the at least one core codec engine defines at least one specified packetizer, and
wherein at least a first one of the one or more methods specified by the class definition of the lower level subclass is invokable by the multimedia application for accessing at least one function of the specified packetizer defined by the at least one core codec engine.

10. The multimedia system of claim 9, wherein the at least one core codec engine further defines at least one specified depacketizer, and wherein at least a second one of the one or more methods specified by the class definition of the lower level subclass is invokable by the multimedia application for accessing at least one function of the specified depacketizer defined by the at least one coded engine.

11. A multimedia system, comprising:

a multimedia framework; and at least one processor operative to execute the multimedia framework and at least one multimedia application out of at least one memory, wherein the multimedia framework includes an application layer, a framework utility layer, and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass, wherein the framework utility layer includes application programming interface and at least one extensible sub-framework, the extensible sub-framework including at least one first object, the first subclass corresponding to the first object, wherein the first object is configured to export a first object interface to the application programming interface, such that the extensible sub-framework is decoupled from the multimedia application executing on the application layer via the first object interface, wherein the first object is further configured to export a second object interface to the core engine via the lower level subclass, such that the extensible sub-framework is decoupled from the core engine via the second object interface, the class definition of the lower level subclass specifying one or more methods invokable by the multimedia application for accessing one or more functions of the core engine, wherein the at least one extensible sub-framework includes an extensible video/text overlay sub-framework, wherein the at least one core engine includes at least one core rendering engine, and wherein the extensible video/text overlay sub-framework is operative to utilize the at least one core rendering engine while performing operations dictated by the respective multimedia application, wherein the first object is a video/text overlay object, and wherein at least a first one of the one or more methods specified by the class definition of the lower level subclass is invokable by the multimedia application for combining a plurality of raw multimedia data streams.

12. The multimedia system of claim 11, wherein the at least one core rendering engine defines at least one specified renderer, and wherein at least a second one of the one or more methods specified by the class definition of the lower level subclass is invokable by the multimedia application for accessing at least one function of the specified renderer defined by the at least one core rendering engine.

13. The multimedia system of claim 11, wherein the application programming interface includes an overlay module containing at least one format definition corresponding to at least a second one of the one or more methods specified by the class definition of the lower level subclass.

14. A method of implementing a multimedia application within a multimedia system, the multimedia system including at least one processor and a packet interface, the at least one processor being operative to execute the multimedia application out of at least one memory, the method comprising the steps of:

receiving a first video packet sequence from a packet interface of the multimedia system;

executing the multimedia application on an application layer included in a multimedia framework, the multimedia framework further including a framework utility layer and a core engine layer, the core engine layer including at least one core engine, the multimedia framework defining a hierarchy of classes including a base class, at least one first subclass, and at least one lower level subclass, each of the first subclass and the lower level subclass having an associated class definition, the lower level subclass inheriting the class definition of the first subclass, the framework utility layer including an application programming interface, an extensible codec sub-framework, and an extensible packetization sub-framework, at least one of the extensible codec and packetization sub-frameworks including at least one first object, the first subclass corresponding to the first object;

exporting, by the at least one of the extensible codec and packetization sub-frameworks, a first object interface to the application programming interface, such that the respective extensible codec and packetization sub-frameworks are decoupled from the multimedia application via the first object interface;

exporting, by at least the extensible codec sub-framework, a second object interface to the core engine via the lower level subclass, such that the extensible codec sub-framework is decoupled from the core engine via the second object interface, the class definition of the lower level subclass specifying one or more methods invokable by the multimedia application for accessing one or more functions of the core engine, the executing of the multimedia application including:

responsive to invoking at least one method of the extensible packetization sub-framework, depacketizing the video packet sequence to obtain a first plurality of video frames compressed according to a first specified coding format;

responsive to invoking at least one of the methods specified by the class definition of the lower level subclass, decoding the first plurality of video frames to generate a raw data stream using the core codec engine via the second object interface;

responsive to invoking at least one of the methods specified by the class definition of the lower level subclass, encoding the raw data stream to generate a second plurality of video frames compressed according to a second specified coding format using the core codec engine via the second object interface;

responsive to invoking at least one method of the extensible packetization sub-framework, packetizing the second plurality of video frames to generate a second video packet sequence; and providing the second video packet sequence to the packet interface of the multimedia system for transmission.

15. The method of claim 14 wherein the hierarchy of classes further includes at least one second subclass, and at least one second lower level subclass, each of the second subclass and the second lower level subclass having an associated class definition, the second lower level subclass inheriting the class definition of the second subclass, wherein the framework utility layer further includes an extensible video/text overlay sub-framework, the extensible video/text overlay sub-framework including at least one second object, the second subclass corresponding to the second object, wherein the core engine layer further includes at least one core rendering engine, wherein the method further comprises:
exporting, by the extensible video/text overlay sub-framework, a third object interface to the core engine via the second lower level subclass, such that the extensible video/text overlay sub-framework is decoupled from the core engine via the third object interface, the class definition of the second lower level subclass specifying one or more methods invokable by the multimedia application for accessing one or more functions of the core rendering engine, and wherein the executing of the multimedia application further includes:
responsive to invoking at least one of the methods specified by the class definition of the second lower level subclass, combining the raw data stream with additional video or text data using the core rendering engine.

* * * * *